United States Patent
MacPherson

[15] 3,656,161
[45] Apr. 11, 1972

[54] MAINTAINING A CIRCULARLY POLARIZED MAGNETIC FIELD AT A MOVING POINT

[72] Inventor: William Frederick MacPherson, Warren Township, Somerset County, N.J.

[73] Assignee: Bell Telephone Laboratories, Incorporated, Murray Hill, N.J.

[22] Filed: Dec. 31, 1969

[21] Appl. No.: 889,464

[52] U.S. Cl. ................343/100 PE, 343/112 D, 340/258 C
[51] Int. Cl. .........................................................H04b 7/00
[58] Field of Search...................343/100 PE, 112 D; 340/25, 340/195, 183, 258, 195, 25; 61/72.5; 175/45

[56] References Cited

UNITED STATES PATENTS

| 3,529,682 | 9/1970 | Coyne et al. | 340/258 C |
|---|---|---|---|
| 3,046,549 | 7/1962 | Kalmus | 343/113 |
| 3,121,228 | 2/1964 | Kalmus | 343/113 |

Primary Examiner—Richard A. Farley
Assistant Examiner—J. M. Potenza
Attorney—R. J. Guenther and Edwin B. Cave

[57] ABSTRACT

A circularly polarized magnetic field is maintained at the location of a subsoil penetrator traveling beneath a dipole-quadrupole field propagating antenna which serves as a reference frame with respect to which the penetrator is guided.

4 Claims, 4 Drawing Figures

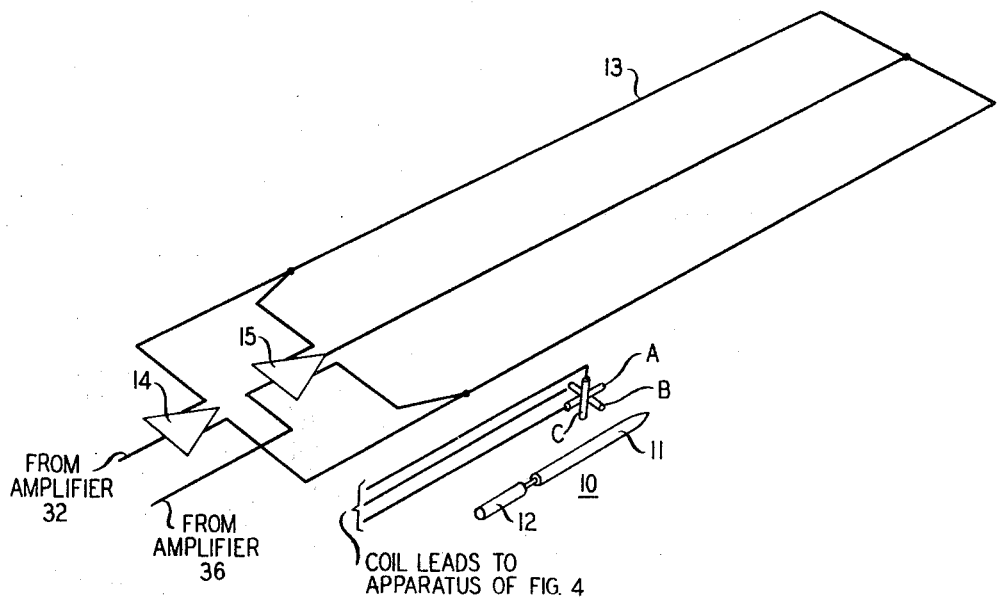
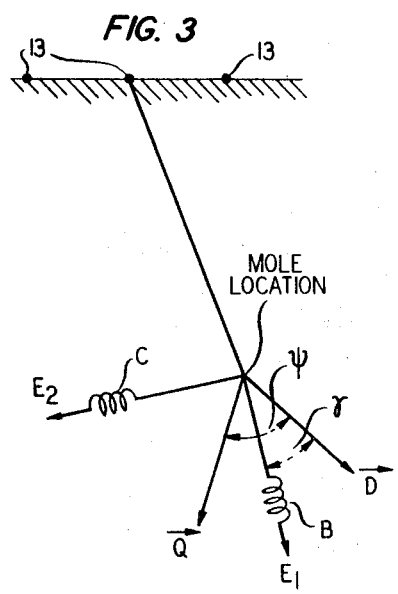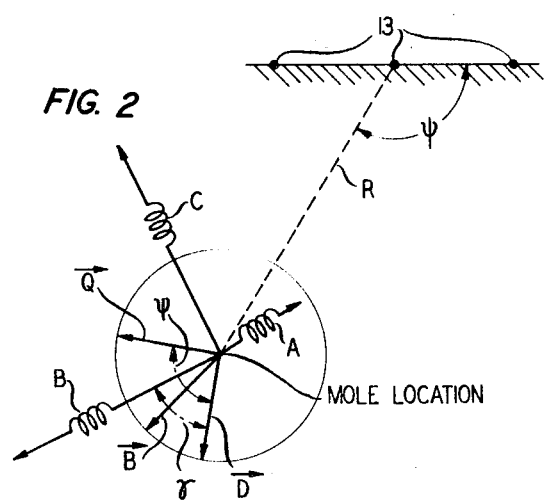

3,656,161

MAINTAINING A CIRCULARLY POLARIZED MAGNETIC FIELD AT A MOVING POINT

FIELD OF THE INVENTION

This invention relates to subterranean missile or "moles", and specifically concerns guidance systems for such devices.

BACKGROUND OF THE INVENTION

In the U.S. Pat. No. 3,589,454 of J. C. Coyne, incorporated herein by reference, a mole guidance system is described which in its preferred embodiment makes use of a circularly polarized rotating magnetic field vector at the mole location. The field in one embodiment is generated by appropriately energizing a dipole and a quadrupole antenna system laid along the ground, the antenna constituting a reference frame with respect to which the mole is guided.

It is stated therein that circular polarization is maintained by monitoring the field-induced output voltages of two transverse, mutually perpendicular magnetometers in the mole body. When these voltages were unequal in magnitude and exhibited phase difference of other than 90°, a small correction to the magnitude and phase of one of the field-generating currents was effected to reestablish the circular field.

In its principal aspect, the present invention concerns signal processing apparatus and method for specifically achieving the above-mentioned antenna current regulation for the continuous maintenance of a circularly polarized magnetic field at the mole location.

Accordingly, a general object of the invention is to effectively guide a subterranean missile.

A specific object of the invention is to maintain a circularly polarized magnetic field at a moving point in soil.

A further object of the invention is to efficiently derive, from voltages induced in a pair of perpendicular magnetometers by sinusoidally energized dipole and quadrupole antenna, control signals for the antenna current regulation which will maintain the voltages at substantially equal magnitude and 90° phase difference.

SUMMARY OF THE INVENTION

The invention is grounded in part in the recognition that the resultant field vector of a sinusoidally energized dipole-quadrupole antenna system, even if not circularly polarized, generates signals in two transverse coils that are a linear combination of voltages separately induced by the dipole and quadrupole fields.

The invention accordingly calls first for modulating the respective induced voltages in said coils by multiplying by sin $\omega_m t$ and cos $\omega_m t$, where the modulating frequency $\omega_m$ is very much less than $\omega_f$, the angular velocity of the resultant magnetic field vector. The resulting signals are summed; the sum is multiplied in a first channel by a term cos $\omega_f t$, the field frequency; and in a second channel by a term cos $(\omega_f t + \beta)$ where $\beta$ is the phase difference between the dipole and quadrupole driving currents.

Thereafter, low frequency components associated with the term $\omega_m$ in each channel are filtered out. The resulting two signals have magnitudes proportional respectively to the dipole and quadrupole field strength. The signal amplitudes are compared, and their phase angle difference is derived. These quantities are then used to produce control signals to adjust the antenna currents and phases so as to maintain the field circularly polarized at the mole.

The invention and its further objects, features and advantages will be readily apprehended from a reading of the detailed description to follow of an illustrative embodiment thereof.

BRIEF DESCRIPTION OF THE DRAWING

FIG. 1 is a schematic diagram of the mole and antenna;

FIGS. 2 and 3 are schematic diagrams of the mole in soil; and

DETAILED DESCRIPTION OF AN ILLUSTRATIVE EMBODIMENT

Figure 4:
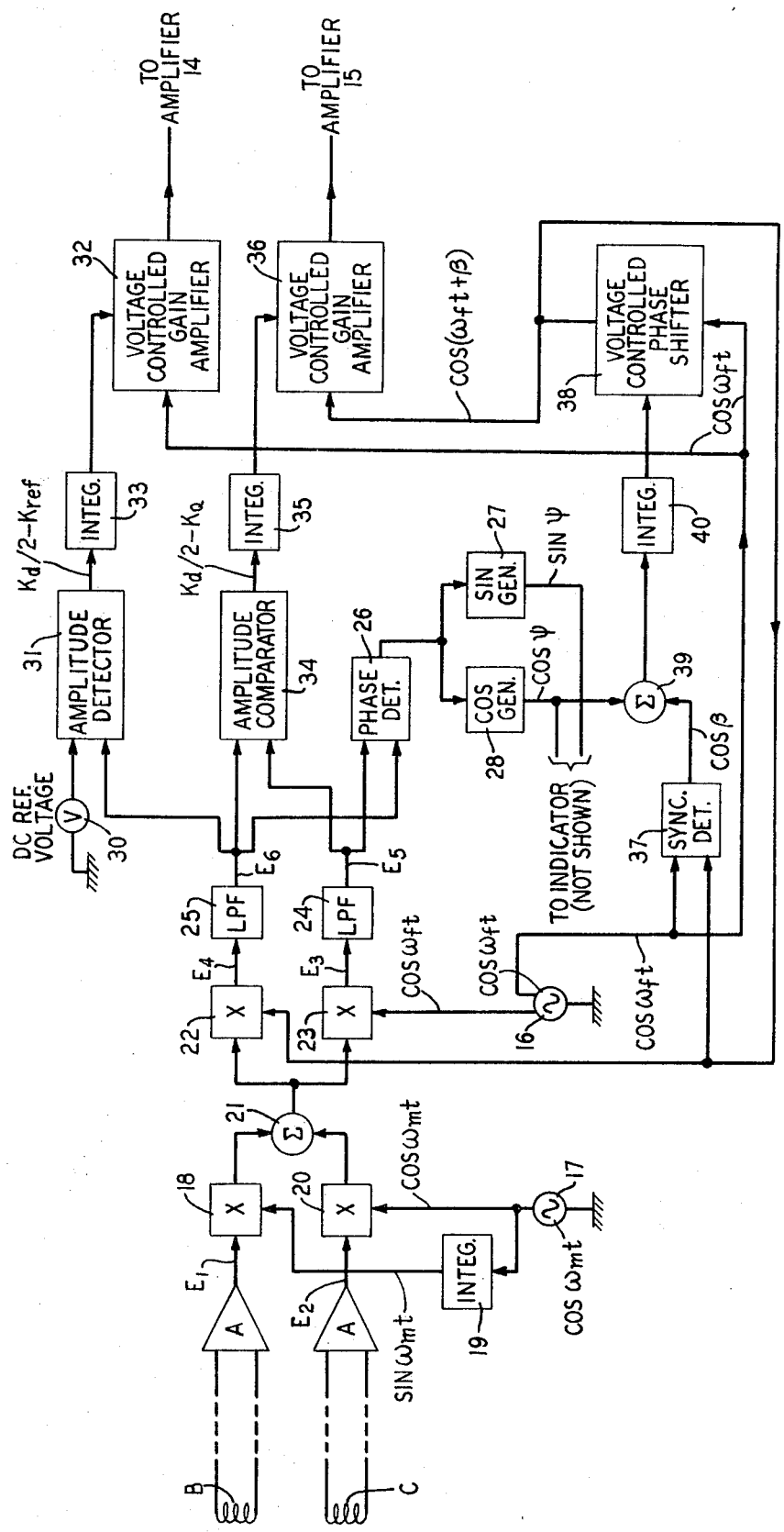
FIG. 4 is a functional block diagram of an electromagnetic control system.

FIG. 1 depicts the operating environment to which the present invention relates. A mole 10 comprising a body 11 and a tail 12 is traversing a course in the earth beneath a stationary combined dipole-quadrupole antenna 13. Tail 12 is pivotally mounted on body 11 and, optionally, may also be rotatably mounted as described in the aforementioned Coyne U.S. Pat. No. 3,589,454. A trio of mutually orthogonal magnetometers consisting of axial coil A, and transverse coils B, C are rigidly mounted within body 11.

Power amplifiers 14, 15 each apply a sinusoidal signal to the respective dipole and quadrupole legs of antenna 13, in accordance with:

$$i_d = I_d \cos \omega_f t \quad (1)$$

and $$i_q = I_q \cos (\omega_f t + \beta) \quad (2)$$

The driving frequency $\omega_f$ for each power amplifier is, for example, 5,000 Hz. The phase angle, $\beta$, represents a phase difference therebetween.

The mole is depicted in FIG. 2 as being in the transverse plane beneath antenna 13 at a point denoted by the polar coordinates R, $\Psi$. At this point the dipole field vector $\vec{d}$ (Equation 1) and the quadrupole field vector $\vec{q}$ (Equation 2) combine to produce a resultant rotating field vector $\vec{b}$, the peak magnitude of which is denoted $\vec{B}$.

As first taught in the Coyne U.S. Pat. No. 3,589,454, it is advantageous for the field to be circularly polarized, that is, for resultant vector B to rotate with constant magnitude at the mole location and with a constant angular velocity $\omega_f$. In the system thus far described, the conditions which ensure circular polarization are:

$$|\vec{D}| = |\vec{Q}| \quad (3)$$
$$\Psi + \beta = \pi \text{ radians} \quad (4)$$

at the mole location.

With vector $\vec{B}$ of constant length and constant angular velocity, as shown in FIG. 2, sinusoidal voltages are generated in the transverse coils B, C whose phases are related to the relative position of vector $\vec{B}$. However, even if the resultant field is not circularly polarized, voltages—designated $E_1$, $E_2$ in FIG. 3—are generated in each coil. Voltages $E_1$, $E_2$ are a linear combination of the separate voltages induced by vectors $\vec{D}$ and $\vec{Q}$. Thus, taking into account a possible mole roll angle $\gamma$, voltages $E_1$ and $E_2$ are:

$$E_1 = -K_d \cos\gamma \sin\omega_f t - k_q \cos(\Psi-\gamma)\sin(\omega_f t + \beta) \quad (5)$$

$$E_2 = -k_d \cos\left(\frac{\pi}{2} \pm \gamma\right)\sin(\omega_f t)$$
$$\qquad - k_q \cos\left(\frac{\pi}{2} + \gamma - \Psi\right)\sin(\omega_f t + \beta) \quad (6)$$

The voltages $E_1$, $E_2$ are now processed as depicted in FIG. 4 in a closed feedback system that depends upon frequency sources 16, 17. The output of source 16 is a sinusoidal voltage proportional to cos $\omega_f t$, where the frequency $\omega_f$ is the basic magnetic field frequency of, for example, 5,000 Hz. The output of source 17 is a sinusoidal voltage proportional to cos $\omega_m t$, where the frequency $\omega_m$ is very much less than the frequency $\omega_f$—for example, 30 Hz.

After the voltages are amplified, voltage $E_1$ is phase-modulated in multiplier 18 by the term sin $\omega_m t$, produced by integrator 19 operating on the source 17 output. In multiplier 20, voltage $E_2$ is phase-modulated by the term cos $\omega_m t$. The resulting signals are summed in summer 21.

The summer 21 output is fed in separate channels to multipliers 22 and 23. Multiplier 22 modulates the summer 21 output by the term cos $\omega_f t$ from source 16. Multiplier 23 modulates this output by the term cos $(\omega_f t + \beta)$, the latter being derived from a circuit point to be described.

The output signals $E_3$, $E_4$ of multipliers 22, 23 thus are, respectively:

$$E_3 = -\frac{k_d}{2}\cos(\omega_m t+\gamma)\sin 2\omega_f t \frac{k_q}{2}\cos(\omega_m t+\gamma-\Psi)\sin(2\omega_f t+\beta)$$
$$-\frac{k_q}{2}\sin\beta\cos(\omega_m t+\gamma-\Psi) \quad (7)$$

$$E_4 = -\frac{k_q}{2}\cos(\omega_m t+\gamma-\Psi)\sin(2\omega_f t+2\beta)$$
$$-\frac{k_d}{2}\cos(\omega_m t+\gamma)\sin(2\omega_f t+\beta)+\frac{k_d}{2}\sin\beta\cos(\omega_m t+\gamma) \quad (8)$$

Filtering of signals $E_3$, $E_4$ in low pass filters 24, 25 blocks all components associated with the frequency $\omega_f$. The resulting signals $E_5$, $E_6$ are $$E_5 = -(k_q/2)\SIN\beta\COS(\omega_m t+\gamma-\Psi) \quad (9)$$
$$E_6 = +(k_d/2)\SIN\beta\COS(\omega_m t+\gamma) \quad (10)$$

The peak value of signal $E_5$, namely the term $k_q/2$ is proportional to the quadrupole field strength at the mole location. Similarly, the peak value $k_d/2$ of signal $E_6$ is proportional to the dipole field strength at the mole location.

PHASE DETECTION

The phase difference between the signals $E_5$ and $E_6$ (Equations 9 and 10) is the polar angle $\Psi$. Accordingly, phase detector 26 derives from the signals $E_5$, $E_6$ a dc output voltage whose magnitude is proportional to the polar angle $\Psi$. From this, sin function generator 27 produces a signal representing $\sin\Psi$; and cos function generator 28 produces a signal representing $\cos\Psi$.

Additionally, a signal representing $\cos\beta$ is generated in a closed feedback loop including synchronous detector 37 whose inputs are $\cos\omega_f t$, from source 16, and $\cos(\omega_f t+\beta)$, the output of voltage controlled phase shifter 38. The input to the latter is a signal representing $\cos\omega_f t$, from source 16. The term $\cos\beta$ and the term $\cos\Psi$ are combined in summer 39, which determines whether the angles $\beta$ and $\Psi$ are supplementary in accordance with the Equation (4) condition for circular polarization. The output of summer 39 is fed to integrator 40 which supplies a dc voltage to phase shifter 38 whose amplitude connotes phase shift change requirements.

If $\cos\Psi$ is relatively constant (as it substantially is, since only mole movement changes the angle $\Psi$), and if $\cos\beta$ is such that the output of summer 39 is other than zero, integrator 40 applies a signal to phase shifter 38 to increase or decrease the term $\cos(\omega_f t+\beta)$ sufficiently to again satisfy Equation (4).

FIELD STRENGTH MAINTENANCE

A dipole field strength reference level is represented by a constant dc voltage from source 30. The reference level is preselected as a safe minimum field strength necessary for signal detection by the magnetometers A, B, C at the designed maximum mole operating depth. Realizing this minimum field strength then requires a certain power capability for driving the antenna, typically about 100 watts.

The dipole field strength at the mole location is maintained at this safe minimum level as represented by the source 30 dc reference voltage. The latter is fed to amplitude detector 31 along with the signal $k_d/2$. The difference of these two inputs, if zero, signifies that dipole field strength at the mole location is at the desired preselected level; and, if not zero, signifies need for field current adjustment for the dipole leg.

Dipole power amplifier 14 is controlled by voltage controlled gain amplifier 32. The output frequency $\omega_f$ of amplifier 32 is supplied from frequency source 16. The amplifier 32 gain is controlled by the signal from integrator 33, the input to which is the difference signal $k_d/2 - k_{ref}$ from amplitude detector 31. If, accordingly, the difference signal is zero, integrator 33 holds its output at a constant value. Hence, the peak dipole antenna current driving amplitude $I_d$ (Equation 1) is unchanged. When the voltage $k_d/2$ 31 $k_{ref}$ has a value not zero, the magnitude and sign thereof is such that causes integrator 33 to change its output thereby to change $I_d$ toward bringing the dipole field vector $\vec{D}$ back to the preselected reference level.

With the dipole field strength maintained at the reference level, the quadrupole field strength is brought to the level that satisfies Equation (3). This is achieved by the functions including amplitude comparator 34, integrator 35, and voltage controlled gain amplifier 36 which drives power amplifier 15. The output frequency of amplifier 36 is determined by the signal $\cos(\omega_f t+\beta)$, derived as earlier described from the output of phase shifter 38. In comparator 34, the signals $E_5$ and $E_6$ (Equations 9 and 10) are compared for amplitude, and the output $k_d - k_9$ is a dc voltage representing their difference. If the dipole and quadrupole field strengths are the same at the mole location, the latter term is zero. Hence, integrator 35 holds its output at a constant level, and the peak quadrupole antenna driving current amplitude $I_q$ (Equation 2) is unchanged. When the output $k_d - k_q$ is other than zero, the control signal from integrator 35 adjusts the peak quadrupole antenna current driving amplitude to bring the quadrupole field strength to the point where Equation (3) is satisfied.

DATA GENERATION

The output of amplifiers 32, 36 are sinusoidals at field frequency $\omega_f$ whose peak values are proportional to $I_d$ and $I_q$, respectively. The ratio $I_q/I_d$ is the polar coordinate R, multiplication of which by the term $\sin\Psi$ (from generator 29) yields the mole depth, and by the term $\cos\Psi$ (from generator 28) yields the mole offset. The roll angle $\gamma$, measured as in FIG. 3 clockwise from field vector $\vec{D}$ to the axis of magnetometer B, is readily derived from the signal $E_6$ by comparing that signal with the reference phase $\cos\omega_m t$ from generator 17. In so detecting roll, the transverse magnetometer B performs an added function. Finally, mole pitch and yaw indicia are gained from noting the magnitude and relative phase of the voltage induced by the circularly polarized resultant vector $\vec{B}$ in the axial coil A, as seen in FIG. 2.

The spirit of the invention is embraced in the scope of the claims to follow.

What is claimed is:

1. A method for maintaining a circularly polarized magnetic field at a moving point, comprising the steps of:
   energizing an antenna, consisting of dipole and quadrupole legs, with first and second sinusoidal signals respectively each of frequency $\omega_f$, the signals having a phase separation $\beta$;
   multiplying the field-induced voltages in two mutually perpendicular coils located at said moving point by terms $\cos\omega_m t$ and $\sin\omega_m t$, where $\omega_m \ll \omega_f$;
   summing the resultant two products;
   multiplying the resultant sum by $\cos\omega_f t$ in a first channel and by $\cos(\omega_f t+\beta)$ in a second channel;
   filtering from said said channel all signals associated with the term $\omega_f$;
   computing a phase separation angle $\Psi$ between the signals in said first and second channels;
   adjusting the energization of said dipole leg until the peak magnitude of said second channel signal is equal to a set reference voltage denoting a desired minimum dipole field strength;
   adjusting the energization of said quadrupole leg until the peak magnitude of said second channel signal is equal to the peak magnitude of said first channel signal; and
   adjusting said phase separation $\beta$ until that angle plus the phase separation angle $\Psi$ are supplementary.

2. Apparatus for maintaining circular polarization of a magnetic field at a specified point R, $\Psi$ beneath a field-propagating antenna, the field created by two vectors having peak values $\vec{D}$, $\vec{Q}$ and rotating at a frequency $\omega_f$ with phase separation $\beta$, comprising:
   two mutually perpendicular coils located at said point;
   means for multiplying the field-induced voltages in said coils by terms $\sin\omega_m t$ and $\cos\omega_m t$ respectively where $\omega_m \ll \omega_f$;

means for summing the resultant two products;

means for multiplying the resultant sum by $\cos \omega_i t$ in a first channel and by $\cos(\omega_i t + \beta)$ in a second channel;

means for filtering from each said channel all signals associated with the term $\omega_f$;

means for monitoring the magnitudes and phase differences of the remaining signals in the respective channels; and means for adjusting said magnetic field using the monitored terms to satisfy the relationships $|\vec{D}| = |\vec{Q}|$ and $\Psi + \beta = \pi$ radians.

3. Method pursuant to claim 1 wherein said moving point is in soil and said coils are mounted in a subsoil penetrator, said antenna as laid out above said soil constituting a reference frame with respect to which said penetrator is to be guided.

4. Apparatus pursuant to claim 2 wherein said specified point is in soil and said coils are mounted in a subsoil penetrator, said antenna as laid out above said soil constituting a reference frame with respect to which said penetrator is to be guided.

\* \* \* \* \*